(12) United States Patent
Zimmermann et al.

(10) Patent No.: US 11,048,240 B2
(45) Date of Patent: Jun. 29, 2021

(54) SAFETY DEVICE AND SAFETY METHOD

(71) Applicant: KUKA Systems GmbH, Augsburg (DE)

(72) Inventors: Tobias Zimmermann, Munich (DE); Luca Leocata, Kissing (DE)

(73) Assignee: KUKA Systems GmbH, Augsburg (DE)

( * ) Notice: Subject to any disclaimer, the term of this patent is extended or adjusted under 35 U.S.C. 154(b) by 119 days.

(21) Appl. No.: 16/095,045

(22) PCT Filed: Apr. 19, 2017

(86) PCT No.: PCT/EP2017/059219
§ 371 (c)(1),
(2) Date: Oct. 19, 2018

(87) PCT Pub. No.: WO2017/182486
PCT Pub. Date: Oct. 26, 2017

(65) Prior Publication Data
US 2019/0101901 A1 Apr. 4, 2019

(30) Foreign Application Priority Data

Apr. 22, 2016 (DE) ..................... 10 2016 107 564.7

(51) Int. Cl.
*G05B 19/418* (2006.01)
*B66F 9/06* (2006.01)
*B66F 9/075* (2006.01)

(52) U.S. Cl.
CPC ... *G05B 19/4185* (2013.01); *G05B 19/41815* (2013.01); *G05B 19/41895* (2013.01);
(Continued)

(58) Field of Classification Search
None
See application file for complete search history.

(56) References Cited

U.S. PATENT DOCUMENTS

2008/0007417 A1* 1/2008 Weishaar .............. B30B 15/288
340/669
2008/0274865 A1* 11/2008 Sturm ................... B23P 21/004
483/15
(Continued)

FOREIGN PATENT DOCUMENTS

CN 2784895 Y 5/2006
CN 101065608 A 10/2007
(Continued)

OTHER PUBLICATIONS

International Search Report dated Jul. 27, 2017 for PCT Patent Application No. PCT/EP2017/059219.
(Continued)

*Primary Examiner* — Mohammad Ali
*Assistant Examiner* — Saad M Kabir
(74) *Attorney, Agent, or Firm* — Bachman & LaPointe, P.C.

(57) ABSTRACT

The invention relates to a safety device (5) and a safety method for a production station (2) for vehicle body parts (4), and for a conveying means (18) moving into and out of the production station (2) for transporting the workpieces into and out of the production station (2). The production station (2) and the conveying means (18) each have their own controller (13, 21) and their own security circuit (22, 23), wherein the security device (5) connects the security circuits (22, 23) of the production station (2) and of the conveying means (18) located in the production station (2). The security device (5) influences and thereby changes a protection region (29) of a protection device (27) of an intrinsically secure conveying means (18) when moving in and out and within the production station (2).

19 Claims, 2 Drawing Sheets

(52) U.S. Cl.
CPC ............. *B66F 9/063* (2013.01); *B66F 9/0755* (2013.01); *G05B 2219/32388* (2013.01); *Y02P 90/02* (2015.11); *Y02P 90/60* (2015.11)

(56) References Cited

U.S. PATENT DOCUMENTS

| | | | |
|---|---|---|---|
| 2010/0127824 A1* | 5/2010 | Moschl ............. | G05B 19/4184 340/5.65 |
| 2013/0190915 A1 | 7/2013 | Choo et al. | |
| 2014/0114526 A1 | 4/2014 | Erb | |

FOREIGN PATENT DOCUMENTS

| | | |
|---|---|---|
| CN | 101185040 A | 5/2008 |
| CN | 101253455 A | 8/2008 |
| CN | 104176152 A | 12/2014 |
| DE | 102007026399 B3 | 11/2008 |
| DE | 102007045143 A1 | 4/2009 |
| DE | 102012020973 A1 | 4/2013 |
| EP | 2722687 A1 | 4/2014 |
| WO | 2007/002967 A1 | 1/2007 |
| WO | 2016/139147 A1 | 9/2016 |

OTHER PUBLICATIONS

Chinese Office Action dated Oct. 29, 2020 for Chinese Patent Application No. 2017800250136.

* cited by examiner

SAFETY DEVICE AND SAFETY METHOD

BACKGROUND

The invention relates to a safety device and to a safety method having the features in the preamble of the main method claim and the main apparatus claim.

It is known from practice to equip production stations and conveying means for transporting workpieces with their own safety circuit in each case. In order to transfer workpieces, the conveying means respectively move to an external and peripheral transfer point at a protective partition of the production station. Safety problems are avoided as a result of the peripheral contact and the handling of the workpieces by means of a handling device inside the station within the scope of the station's own safety circuit.

SUMMARY

The object of the present invention is to show improved safety technology.

The invention achieves this object with the features in the main method claim and the main apparatus claim.

The claimed safety technology, that is to say the safety device and the safety method, has various advantages.

The safety technology is particularly suitable for a production station into which conveying means move and out of which conveying means move and transport workpieces into the production station and out of the latter. In particular, the conveying means can move in this case to a working point inside the station, at which a process is carried out on the individual or multiple workpieces. The conveying means can remain at the working point during the process or can be changed.

The claimed safety technology connects the safety circuits of the production station and of the conveying means situated in the production station. In particular, the conveying means can be incorporated in this case as a triggering safety element and as a disconnectable safety element. An emergency disconnection, a so-called emergency shutdown, which is triggered by the conveying means and its safety circuit acts on the safety circuit of the production station as a result and can ensure that the production station is shut down. On the other hand, an emergency shutdown of the production station and its safety circuit results in the conveying means in the production station being disconnected or shut down.

A corresponding situation applies to a production station having a plurality of production cells which are separate from one another and each have a cell-specific safety region in the safety circuit. In the case of a multi-cell production station, the safety circuit of the conveying means can be connected to the respective cell-specific safety region if the conveying means remains in a production cell and, on the other hand, can be temporarily connected to both cell-specific safety regions if the conveying means changes cell.

The safety circuit of the production station can have a further division of the region. Further safety regions can be respectively formed at the locks. Safety responses or safety measures graded according to the type of safety situation are possible in said safety regions. A minor local disruption may result in individual station or cell components being shut down, while the others can continue to operate in the automatic mode. An emergency shutdown preferably has an effect across the station.

In the case of an intrinsically safe conveying means, the protection region of its protective device can also be influenced and changed during entry and exit and inside the production station by means of the safety technology. In particular, the protection region can be reduced during entry and when remaining in the production station and can be increased again during exit. This design and function of safety technology have an independent inventive significance and can also be used in other safety devices and safety methods, in particular according to the respective features in the preamble of the independent claims.

The safety device has a communication device for communication between the production station and the conveying means. The communication device can be used to connect said safety circuits. The safety device may also have a control module for this purpose. The latter may have a hardware and/or software design. During the connection of the safety circuits and the preferred wireless communication via a WLAN, it is possible to establish a bus connection between the safety circuits, in particular between the controllers of the production station or the production cell and of the conveying means which are connected thereto.

The safety technology can recognize a conveying means situated in the region of the production station and, for this purpose, may have corresponding recognition technology, that is to say a recognition device and a recognition method. The recognition can be used to recognize a conveying means as such and to distinguish it from other safety-relevant objects, in particular a human body, in particular during entry and exit and in the event of one or more possible cell changes.

The recognition technology may be incorporated in the safety circuit of the production station or the production cell. For example, unauthorized entry of a worker at a lock provided for the entry and/or exit of a conveying means in an otherwise encompassing protective partition of a production station or a production cell can be determined using said detection technology and can result in a safety response, in particular an emergency shutdown.

The conveying means can also be identified and located. In order to maintain safety, the safety technology can use this to deliberately capture and control the position and path of the conveying means.

As a result, the safety circuits can be connected and disconnected and/or the protection region of the protective device can be reduced and increased with a defined location reference in the region of the production station.

It is also possible to capture whether the conveying means is situated at an intended location in the station region at an intended time. The safety technology can use this to deduce whether the conveying means is carrying out movement commands correctly. If the destination is not reached and if corresponding feedback is absent, a potential safety problem is assumed and a safety measure, for example an emergency shutdown of the production station and of the conveying means, is initiated.

Individual or preferably multiple detection means, in particular a muting light barrier, used to recognize and/or distinguish a conveying means can be present at said lock. Detection means are advantageously arranged at the entry and exit of a lock. They may have an axial distance, with the result that only one detection means respectively detects the transport means upon entering and leaving the lock and the respective other detection means performs its safety function for protecting against unauthorized entry of a worker or other entry of a foreign body to the production station or the production cell.

The recognition technology may have corresponding identification technology, that is to say an identification device and an identification method, for identifying a conveying means. During the identification, the identity of a conveying means is preferably linked to its current position. This can preferably be used to recognize where a particular conveying means is situated in the region of the production station.

This identification can be carried out before and inside a lock as well as at one or more points inside the production station or production cell. The identification technology can use corresponding identification means to capture the position of a conveying means. In this case, it can also capture the identity of the latter. Alternatively or additionally, the identity can be reported by the conveying means. The identification can be carried out by the conveying means and/or by the production station.

A position can be captured, for example, by virtue of identification means carried on the conveying means communicating with local identification means in the station region having a known position and/or identity. The communication may be tied to the location. It can only be carried out, for example, if the identification means are in the immediate vicinity of one another. The position of the conveying means in the station region can be indirectly recognized by communicatively capturing the identity of a local identification means, for example by means of optocouplers or by reading RFID tags, QR codes, barcodes or the like.

The safety technology may have a control module. The latter may have a hardware and/or software design. It may be assigned to the production station and to the conveying means and may be connected to their respective safety circuit. The control module can be independently designed and arranged or can be implemented in an existing controller of the production station and of the conveying means, for example as a software module.

A production station and a conveying means or a production plant can be equipped with the claimed safety technology during the initial equipment or over the course of retrofitting.

The production station may have a production device inside the station and a station controller as well as a surrounding protective petition provided with one or more locks. In the case of a production station having a plurality of production cells, an internal protective partition having a lock may be present between the production cells. Recognition technology may likewise be present at this lock. The production cells may each have a cell-specific safety circuit. The identification means may be arranged inside a lock and in a region, in particular an external region, adjoining the lock.

The communication device may be independent. It may alternatively be partially or completely integrated in a communication device somewhere else. The safety-related communication can be carried out via the communication device and via communication units in a controller of the conveying means and in a station controller. On the other hand, communication may take place with an external controller, for example a plant controller or a controller of a production device.

The movements of the conveying means can be controlled by an external controller of a conveying device. The safety technology can influence this control communication by virtue of the controller of the conveying device receiving movement orders only from the station controller for a conveying means situated in a production station, for example. Control and movement commands for this conveying means can then be prompted only from the station controller. In the case of a multi-cell production station, a station controller can be divided, in terms of hardware and/or software, into cell-specific control units. In this case, a priority or master function may be present in one of the cell-specific control units.

BRIEF DESCRIPTION OF THE DRAWINGS

The invention is illustrated schematically and by way of example in the drawings, in which.

DETAILED DESCRIPTION

Figure 1:
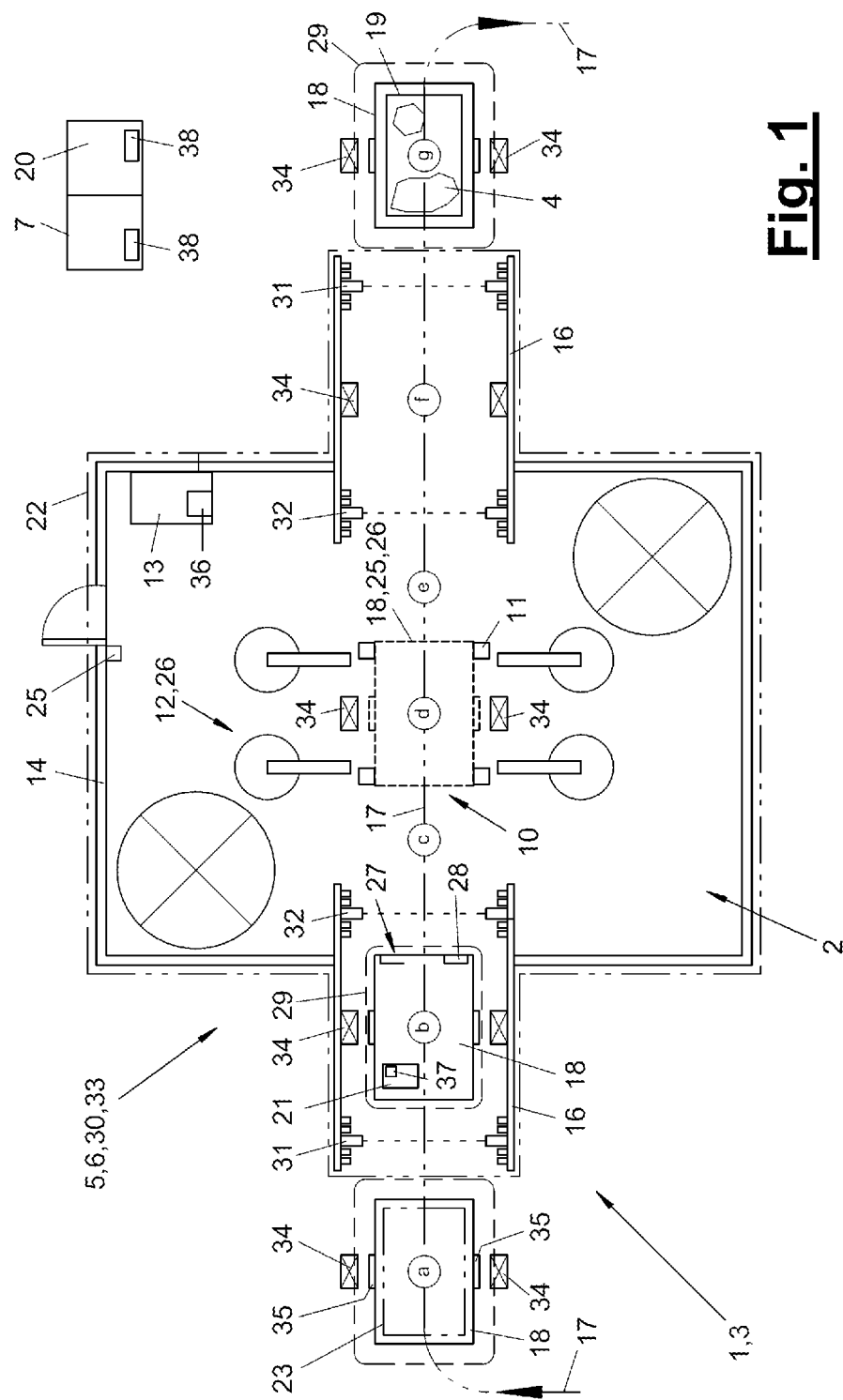
FIG. 1 shows a schematic illustration of a single-cell production station having a conveying means and safety technology.

The invention relates to a safety device (5) and to a safety method for a production station (2) and a conveying means (18). The invention also relates to a production plant (1) having one or more production stations (2) and having a conveying device (3) having one or more conveying means (18). The invention also relates to an associated production method.

The production station (2) may be designed differently. In the variant from FIG. 1, it has an individual production cell. In the embodiment from FIG. 2, two or more production cells (8, 9) are present.

The production plant (1) has one or more production stations (12), one of which is illustrated in more detail by way of example with its components in FIG. 1. The production plant (1) also has a conveying device (3) for transporting workpieces (4). This conveying device comprises one or more conveying means (18) and a network of conveying paths (17) on which the conveying means (18) run. The conveying device (3) may also have a controller (20) having a fleet manager for the fleet of conveying means (18). The conveying means (18) are individually controllable and move on freely programmable conveying tracks in the network of conveying paths. The conveying means (18) may be designed in any desired suitable manner. They are preferably in the form of autonomous, floor-bound, driverless transport vehicles (AGV or FTF).

The production plant (1) may also have a logistics region (not illustrated) in which workpieces (4) are provided, picked and loaded onto conveying means (18). It may comprise further components.

Over the course of an automatic production method, one or more workpieces (4) may be machined using different processes in a sequence of production steps. The production steps are carried out, for example, in succession in a plurality of production stations (2) with appropriate intermediate transport of the workpieces (4). Alternatively, the production steps can be carried out in an individual production station (2).

The production station (2) has at least one working point (10) inside the station and a production device (12) for carrying out any desired process on one or more workpieces (4). The production device (12) may have one or more industrial robots for handling the workpiece(s) (4) and for carrying out process with possibly changeable tools and tool magazines which are indicated in FIG. 1.

These processes may relate to different techniques, for example joining, in particular welding, soldering or adhesive bonding, applying and removing materials, heat treatments, reshaping, material-removing machining, assembling and mounting operations or the like. Furthermore, the production processes may relate to identical or different workpieces (4), in particular workpiece types. The workpieces (4) which are initially separate may be joined to form one or more assemblies.

The workpiece(s) (4) is/are transported by a conveying means (18) into the production station (2) and out again. The conveying means (18) moves in this case on a conveying path (17) into the production station (2) as far as the working point (10) and moves out again. The exit may take place at the entry point or at another point. In particular, the conveying means (18) can move through the production station (2). Only one individual conveying means (18) is respectively preferably situated in the production station (2). In a manner differing from this, a plurality of conveying means (18) are illustrated in the drawings in order to make the design details of the conveying means more easily recognizable.

The preferably multiple workpieces (4) are situated on a load carrying means (19) which is schematically indicated in FIG. 1 and is arranged on the conveying means (18). The arrangement is preferably releasable. This makes it possible, on the one hand, to change the conveying means (18). On the other hand, for the purpose of exactly positioning the workpiece(s) (4) in a manner appropriate for the process, the load carrying means (19) can be carried on a schematically indicated frame (11) at the working point (10) and can be released from the conveying means (18) in this case. The frame (11) forms a positioning apparatus and is preferably height-adjustable.

The load carrying means (19) is adapted to the workpiece(s) (4). It preferably carries a plurality of workpieces (4) in a picked, defined and exactly positioned arrangement. The workpieces (4) may have an identical or different design.

The workpieces (4) can be designed in any desired manner and can serve any desired purposes. They are preferably vehicle body parts for a vehicle body, in particular sheet metal parts. The production station (12) can be provided and designed for producing workpieces (4) of flexible types. The workpieces (4), for example side wall parts of a vehicle body, are designed in a similar or identical manner in this case, in which case they have type-specific differences. This makes it possible to produce different vehicle body types, for example two-door or four-door, a convertible, a sedan or the like. The production can be carried out in a free mix, in which case the production station (2) can be adapted accordingly.

The production station (2) has a protective partition (14) which surrounds the station in a laterally circumferential manner, is in the form of a fence, for example, and prevents the unauthorized entry of persons to the inner station region. The protective partition (14) can be interrupted for the entry and exit of a conveying means (18) and can have one or more locks (16). These may be in the form of elongate passage openings with lateral protective walls or an enclosure. The protective partition (14) may also have monitored and closable entries for persons.

The production station (2) has a station controller (13). The production station (2) can also have further components required for operation of the station such as an energy supply, a supply of operating means, test devices or the like.

The production station (2) has a safety circuit (22). The latter is connected to the station controller (13). The safety circuit (22) can be subdivided into a plurality of safety regions.

The safety circuit (22) has a plurality of triggering safety elements (25) which detect a safety problem and report it to the controller of the safety circuit, in particular the station controller (13), via a communication channel, in particular a bus. Such a safety element (25) may be a monitoring means, for example, which monitors the position and the opening of an access door in the protective partition (14).

The safety circuit (22) may also include disconnectable safety elements (26) which are shut down or disconnected in a safety situation. The production device (12), in particular its industrial robots, can be incorporated in the safety circuit (22) as such a disconnectable safety element (26), for example.

The conveying means (23) may have its own safety circuit (23) and its own controller (21) connected thereto. Detecting or triggering safety elements and disconnectable safety elements, for example a drive, may likewise be incorporated in this safety circuit (23).

In particular, the conveying means (23) may have a protective device (27) which uses a sensor system (28), for example a laser scanner, to scan the environment of the transport means (18) in a protection region (29) for any obstacles or other safety problems. The range of the sensor system determines the protection region (29) and can be changed.

The conveying means (18) may have intrinsic safety and, for normal movement and travel operation outside the production station (12), may have a wide or deep protection region (29) which surrounds the transport means (18) at least at certain points, preferably completely surrounds the transport means.

The safety circuits (22, 23) may belong to safety technology. The latter comprises a safety device (5) and a safety method. The safety technology connects the safety circuits (22, 23) of the production station (2) and of the conveying means (18) if the latter is situated in the production station (2), in particular at the working point (10). The safety circuits (22, 23) can also already be connected during entry. During exit and when leaving the production station (2), the safety device disconnects the safety circuits (22, 23) again.

The safety device (5) has a control module (24) which controls the functions of the safety device (5) and of the components of the latter. The control module (24) may have a hardware and/or software design. It may be independently designed and arranged. In the exemplary embodiments, it comprises software modules which are implemented in the station controller (13) and possibly the controller (21) of the conveying means (18).

When connecting the safety circuits (22, 23), the conveying means (18) is incorporated, on the one hand, as a triggering safety element (25) and, on the other hand, as a disconnectable safety element (26). The connected safety circuits (22, 23) are mutually influenced. In the case of a safety situation, in particular an emergency shutdown, of the station's own safety circuit (22), the safety circuit (23) of the conveying means (18) is activated and causes the conveying means (18) or individual ones of its components to be shut down or disconnected. Conversely, a safety situation detected by the safety circuit (23) of the conveying means (18) and a possibly triggered emergency shutdown are transmitted to the safety circuit (22) inside the station and result in a corresponding safety response, in particular an emergency shutdown, there.

The safety device (5) has a communication device (6) for communication between the production station (2) and the conveying means (18). The safety circuits (22, 23), in particular, can be connected and can communicate with one another thereby. Communication is carried out between the controllers (13, 21) of the production station (2) and of the conveying means (18). For this purpose, communication units (36, 37) can be arranged at a suitable point, in particular on the controllers (13, 21).

The communication device (6) can be independently and separately designed and arranged. Alternatively, it may be partially or completely part of a communication device which is present elsewhere. In particular, this may relate to communication with an external and superordinate controller which may be in the form of a plant controller (7) of a production plant (1) and/or a controller (20) of the conveying device (3), for example. The plant controller (7) and/or the controller (20) may likewise have a communication unit (36, 38).

The units (36, 37, 38) can communicate in a wired or wireless manner. Wireless communication, for example by radio, is preferred. It may preferably also be carried out between the controllers (13, 21) within the scope of a WLAN or a WLAN connection. During this communication, it is possible to set up a bus connection between the safety circuits (22, 23) and the controllers (13, 21). The safety circuits (22, 23) may in turn have a bus system. The Profinet bus, for example, is suitable as the bus system.

The safety device (5) has recognition technology for a conveying means (18) situated in the region of the production station (2). The recognition technology comprises a recognition device (30) and a recognition method. The recognition device (30) can be used to recognize a conveying means (18) as such and to distinguish it from other objects. In particular, it is possible to distinguish it from persons. The recognition technology can be incorporated in the station safety circuit (22).

The safety device (5) may also have identification technology for identifying a conveying means (18), wherein the safety technology recognizes the identity and/or the current position of the conveying means (18), preferably the identity and the current position of the conveying means (18). The identification technology comprises an identification device (33) and an identification method.

The recognition device (30) has a detection means (31, 32) which carries out said recognition of a conveying means (18). The detection means (31, 32) is arranged, for example, at a lock (16) in a protective partition (14, 15) of the production station (2). Individual or multiple detection means (31, 32) may be present. In the embodiments shown, two detection means (31, 32) are arranged at a lock (16) and are situated with a mutual axial distance at the entry and exit of the lock (16). They detect the conveying means (18) moving through the lock (16). The axial distance in the direction of travel is so large, in the case of a corresponding lock length, that the conveying means (18) does not trigger any of the detection means (31, 32) in the central lock position.

The detection means (31, 32) can be designed in any desired suitable manner. In the exemplary embodiments shown, the detection means is a muting light barrier. The latter comprises at least one central light barrier and further sensors, for example further light barriers, adjoining on both sides in the conveying and lock direction. A conveying means (18) and its form can be recognized by their interruption of the light barriers and can be distinguished from shorter objects. In this case, it is possible to observe which light barriers or other sensors in the row are free and which have been interrupted. The time factor can also be recorded for the duration of an interruption and can be included in the recognition.

In the case of a double arrangement of detection means (31, 32) at a lock (16), a muting function may be present only for one detection means, for example the outer detection means (31). In the case of the multi-cell production station (2) from FIG. 2, at least one detection means (31) can be arranged at the transition point between the production cells (8, 9) and a lock (16) which is possibly there. Said detection means may comprise, but need not comprise, a muting function. The individual detection means (31), and the inner detection means (32), can alternatively be in the form of a simple sensor system, for example a light barrier, without this function.

The identification device (33) has identification means (34, 35) on the production station (2) and on the conveying means (18). One identification means (34) are arranged at a known and defined position and preferably in a stationary manner on the production station (2), for example. Multiple identification means (34) are present in the station region and each have their own identity. They are in the form of location-bound ID transmitters, for example RFID tags in the floor or at another point.

The other identification means (35) are, for example, in the form of an associated reading device for reading the ID codes of the identification means (34). The identification means (35) are movable or fixed and are arranged on the conveying means (18). The assignment and kinematics of the identification means (34, 35) can also be reversed. In addition, the design of the identification means (34, 35) may vary. They may be in the form of optocouplers, for example.

The communication of the identification means (34, 35) is spatially limited. It can be carried out only if the identification means (34, 35) are in the immediate vicinity of one another. The transmission of the ID code is thereby linked to an item of location information relating to the current position of the conveying means and can be accordingly evaluated by the safety technology.

The controller (21) of the conveying means (18) is connected to the identification means (35). It can report the captured ID code of the stationary identification means (34) to the station controller (13) via the communication device (6). In this case, it can also communicate the separate identity of the conveying means (18) or an ID code. The station controller (13) or the safety device (5) recognizes the identity of the conveying means (18) and its current location or position by means of the two items of information.

In the embodiments shown, the coded identification means (34) are arranged, for example, in a lock (16) and in the region in front of the latter outside the production station (2). The identification means (34) are arranged, for example, in pairs and on both sides of the conveying path (17). An arrangement which is preferably central in the transport direction is provided in a lock (16).

The reading identification means (35), for example, are preferably likewise arranged in pairs and on the two longitudinal sides of the conveying means (18) in this case. In this case too, an arrangement which is central in the longitudinal direction is preferred. The spatial arrangement of the identification means (34, 35) is selected in such a manner that they can communicate with one another in the case of a journey of the conveying means (18) along the conveying path (17), preferably when stationary. However, communication is also possible during the journey, that is to say "on-the-fly". The longitudinal extent thereof is limited, thus resulting in a virtually punctiform arrangement. In the case of a reading operation and an accordingly exactly positioned conveying means (18), the position of the latter can therefore also be detected using the known stationary position of the identification means (34). An arrangement of the reading identification means (35) below the conveying means (18) or inside the conveying means (18), possibly with a downward orientation, would also be conceivable, with the result that it is accordingly possible to communicate with the identification means (34) preferably arranged on or in the floor.

Further station identification means (34) may be arranged at one or more points inside the production station (2), for example at the working point (10) or at intermediate positions of the conveying path (17) or of the travel path between the lock (16) and the working point (10). This makes it possible to also determine the position of the conveying means (18) inside the production station (2).

The safety device (5) can change the intrinsic safety of a transport means (18) in the station region. For this purpose, the width or depth of the protection region (29) can be reduced, for example. If the transport means (18) enters a lock (16) and is recognized via the recognition device (30), the station controller (13) can reduce the protection region (29) via the controller (21) of the conveying means (18). This facilitates the navigation of the conveying means (18) inside the production station (2) and, in particular, at the working point (10) and the frame (11) there.

The reduction in the protection region can be associated with said connection of the safety circuits (22, 23). If the protection region (29) is reduced, the intrinsic safety is not or is no longer fully available. This can be compensated for by means of the incorporation in the station safety circuit (22) and its monitoring means (25). Upon leaving the production station (2), in particular upon recognizing a conveying means (18) in a lock (16), the protection region (29) can then be increased again, with the result that the conveying means (18) again gains its intrinsic safety for the further journey outside the production station (12).

Figure 2:
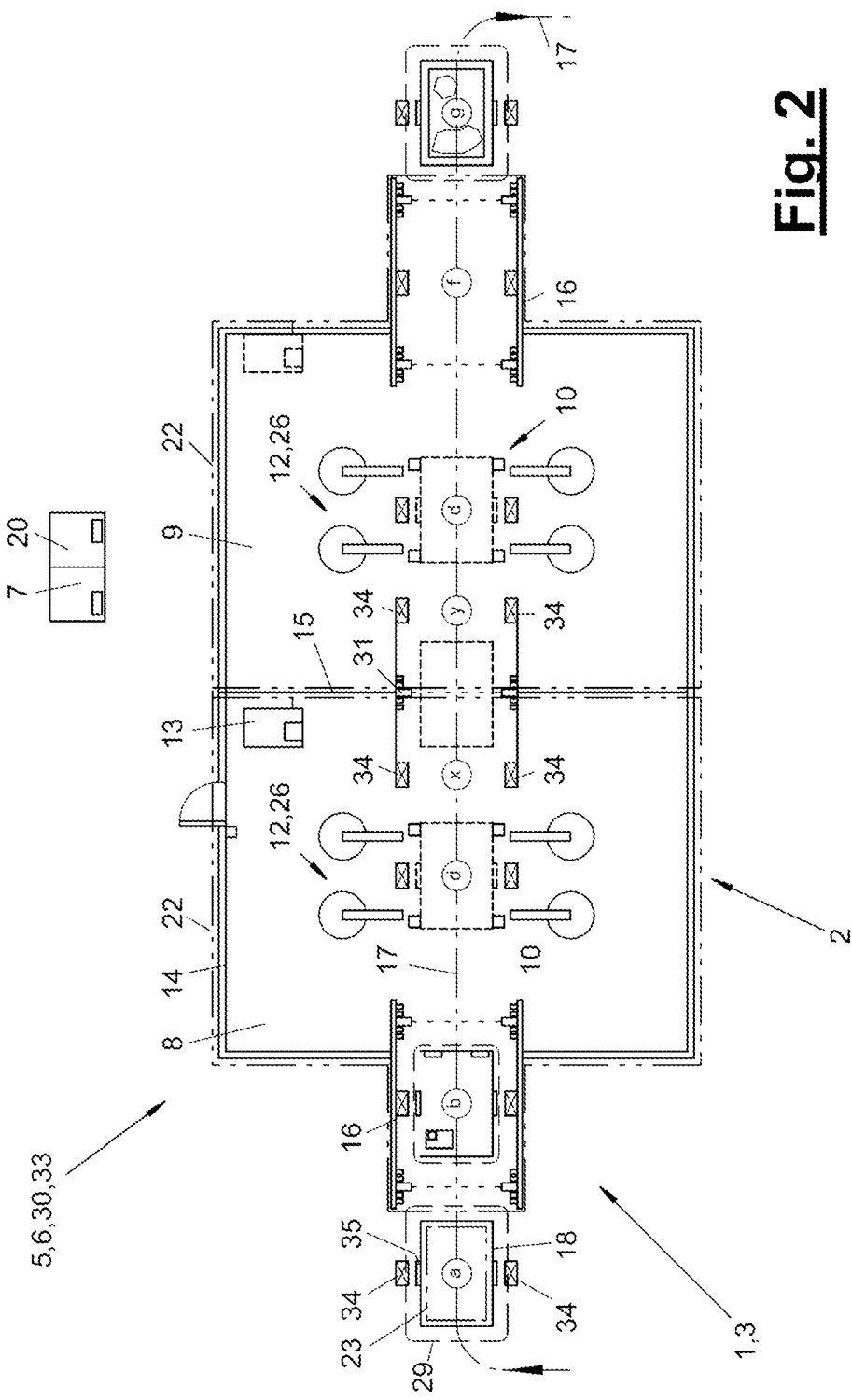
FIG. 2 shows a variant of a production station having a plurality of production cells.

In the variant from FIG. 2, the production station (2) is subdivided into two or more production cells (8, 9). It is again surrounded, on the outside, by a protective partition (14) having one or more locks (16). A protective partition (15) inside the station is arranged between the production cells (8, 9) and can likewise have a lock (16) of the type described above. This may also have the above-described recognition technology (30) having the detection and identification technology. An individual detection means (31) is arranged centrally on the lock (16), for example. Station identification means (34) are situated at the ends of the lock.

The production cells (8, 9) may each have a working point (10) and a production device (12) of the type described above. Each production cell (8, 9) may have its own safety region inside the station-encompassing safety circuit (22). In the case of a multi-cell production station (2), the station controller (13) can be divided, in terms of hardware and/or software, into indicated cell-specific control units. The cell-specific safety region (22) is respectively connected to the cell-specific control unit. One of these control units may have a priority or master function. Furthermore, in the case of the multi-cell production station (2), the safety circuit (22) may have a cell-encompassing common emergency shutdown circuit.

The sequence of a conveying means (18) entering a production station according to FIG. 1 is described below.

A superordinate warehouse manager which is possibly present and is arranged, for example, in the plant controller (7) issues the controller (20) or the fleet manager with the instruction to command a conveying means (18) to a position (a) in front of the entry to the production station (2) and its lock (16) and to transmit a corresponding movement command to the conveying means (18) by means of the communication device (6). The conveying means (18) notifies the controller (20) or the fleet manager when the position (a) is reached. The fleet manager notifies the warehouse manager that the movement order has been executed. The warehouse manager notifies the station controller (13) of which conveying means (18), preferably with which load carrying means (19) and also preferably with which workpiece configuration, is in front of the entry and which process is intended to be carried out on the workpieces (4) at the working point (10). The information is also interchanged here via the communication device (6).

The station controller (13) communicates with the controller (21) of the conveying means (18), wherein a bus connection is established via WLAN. The station controller (13) also asks the controller (21) of the conveying means for the ID codes of the stationary identification means (34) or ID transmitters embedded in the floor at the position (a), for example. The controller (21) of the conveying means (18) uses its identification means (35) to read said ID codes and reports these codes, together with the ID code of the conveying means (18), to the station controller (13) for verification. If these codes match the specification, the conveying means (18) is identified as an associated conveying means (18) actually provided for the production sequence and is also captured, with its position, by reading the ID codes. If the ID codes match, the safety circuits (22, 23) of the production station (2) and of the conveying means (18) are connected.

The station controller (13) also transmits a lock request to the fleet manager, with the result that the latter accepts only movement orders which come from the station controller (13) for the relevant conveying means (18). Other movement orders, for example from the warehouse manager or from another point, are blocked. The station controller (13) then orders the controller (20) or the fleet manager to move the conveying means (18) into the entry lock (16), which is prompted by the fleet manager by means of a movement command to the conveying means (18). Instead of blocking the movement orders from other points, it would also be conceivable to allow only those movement orders which can be clearly identified as coming originally from the station controller (13) and therefore come indirectly from the station controller (13). Upon entry, the conveying means (18) moves through the outer detection means (31), wherein the station controller (13) connected to the recognition device (30) controls and monitors said recognition and the so-called muting. The controller (21) notifies the controller (20) or the fleet manager when the lock (16) is reached and the position (b) is assumed. The fleet manager in turn notifies the station controller (13) that the movement order for the relevant transport means (18) has been concluded.

The station controller (13) asks the controller (21), in the manner described above, for the ID codes of the identification means (34) which are now situated in the lock region, which codes are accordingly read and fed back to the station controller (13) and are evaluated by checking the ID codes. In the event of a match, the station controller (13) orders the controller (21) of the conveying means (18) to reduce the protection region (29), which is acknowledged by means of feedback after execution. The station controller (13) prompts the entry of the conveying means (18) into the production station (2) and to the working point (10) and to the position (d) there via the fleet manager in the manner described above. In this case, an intermediate position (c) may possibly be assumed and may be captured for control purposes. Upon leaving the lock (16), the conveying means (18) moves through the second and inner detection means (32) which is possibly present, wherein the muting is controlled and monitored in the manner described above.

During or after conclusion of the processes on the workpieces (4), the conveying means (18) can move out of the production station (2) in a reverse or forward motion, which is prompted by the station controller (13) in cooperation with the controller (20) or the fleet manager. In this case, the muting, recognition and identification operations described above also take place.

If the identification is carried out in the exit lock (16) and if the ID codes match, the protection region (29) is increased again and the transport means (18) is made intrinsically safe and this is acknowledged by means of feedback. During exit, the transport means (18) assumes the positions (e), (f) and (g). Upon reaching the position (g) outside the lock (16), the safety technology again disconnects the safety circuits (22, 23). In addition, the order blockade for the conveying means (18) which is now no longer situated in the production station (2) is canceled again, with the result that its further movement can be ordered by the warehouse manager or by another party or point and can be commanded via the controller (20).

In the case of the multi-cell variant of the production station (2) from FIG. 2, the sequences during entry and exit of a conveying means (18) into and out of the production station (2) are the same as in FIG. 1. A re-registration is carried out on account of the cell-specific safety circuits (22, 23) if the cell is changed and the conveying means (18) enters the next cell (9). For this purpose, the conveying means (18) situated in the first production cell (8) is commanded into the re-registration position (x) in front of or at the entry of the lock (16) inside the station via the controller (13, 20). After said position has been reached and following feedback, the safety circuit (23) of the conveying means (18) is connected to both cell-specific safety circuits (22) of the two production cells (8, 9). The conveying means (18) is then commanded to the second re-registration position (y) at the exit of the lock in the manner mentioned, upon the reaching of which position the safety circuit of the first production cell (18) that has now been left is disconnected and only a connection between the safety circuit (22) of the second production cell (9) and the safety circuit (23) of the conveying means (18) exists.

Modifications of the embodiments shown and described are possible in various ways. In particular, the technical configurations of the safety device (5) and of the recognition and identification device (30, 33) can be modified. The stationary identification means (34) can carry out the communication and reading function for the ID code of the transport means (18) stored in the moving identification means (35) and can report this ID code, together with its own ID code, to the station controller (13) or safety device (5). Furthermore, the features of the exemplary embodiments described above and of the modifications mentioned can be combined with one another in any desired manner and can possibly be interchanged.

LIST OF REFERENCE SIGNS

1.) Production plant
2.) Production station
3.) Conveying device
4.) Workpiece, vehicle body part
5.) Safety device
6.) Communication device
7.) Plant controller
8.) Production cell
9.) Production cell
10.) Working point
11.) Frame
12.) Production device
13.) Station controller
14.) Station protective partition
15.) Cell protective partition
16.) Lock
17.) Conveying path
18.) Conveying means, AGV
19.) Load carrying means
20.) Conveying device controller, fleet manager
21.) Conveying means controller
22.) Production station safety circuit
23.) Conveying means safety circuit
24.) Control module
25.) Triggering safety element, monitoring means
26.) Disconnectable safety element
27.) Protective device
28.) Sensor system, laser scanner
29.) Protection region
30.) Recognition device
31.) Detection means, outer muting light barrier
32.) Detection means, inner muting light barrier
33.) Identification device
34.) Identification means, ID transmitter, RFID tag
35.) Identification means, reading device
36.) Station communication unit
37.) Conveying means communication unit
38.) Plant controller communication unit

The invention claimed is:

1. A production system comprising:
a production station (2) for workpieces (4); and
a plurality of automated guided vehicles (AGV) (18) each of which can be moved into and out of the production station (2) for transporting the workpieces (4) into and out of the production station (2),
wherein:
the production station (2) has one or more industrial robots; and
the production station (2) and each of the AGV (18) each have their own controller (13, 21) and their own safety circuit (22, 23), characterized in that the safety device (5) connects the safety circuits (22, 23) of the production station (2) and of the AGV (18) when said AGV is situated in the production station (2) wherein the safety device (5) changes a protection region (29) of a protective device (27) of an intrinsically safe AGV (18) during entry and exit of said AGV to the production station (2) so that:
during entry of the AGV to the production station, a protection region of said AGV is reduced; and
during exit of the AGV from the production station, the protection region of said AGV is increased.

2. The production system as claimed in claim 1, characterized in that the safety device (5) has a communication device (6) for communication between the production station (2) and the AGV (18).

3. The production system as claimed in claim 1, characterized in that the safety device (5) has a recognition device (30) for AGV (18) situated in the region of the production station (2).

4. The production system as claimed in claim 1, characterized in that the safety device (5) has a control module (24).

5. The production system as claimed in claim 1, characterized in that the AGV are floor-bound, driverless transport vehicles.

6. The production system as claimed in claim 1, characterized in that the AGV transport the workpieces between a plurality of production stations.

7. The production system as claimed in claim 3, characterized in that the recognition device (30) has a detection means (31, 32) for recognizing the AGV (18).

8. The production system as claimed in claim 7, characterized in that the detection means (31, 32) is arranged at a lock (16) in a protective partition (14, 15) of the production station (2).

9. The production system as claimed in claim 7, characterized in that the detection means or a respective detection means (31, 32) is arranged at the entrance and exit of a lock (16).

10. The production system as claimed in claim 7, characterized in that the detection means (31, 32) is in the form of a muting light barrier.

11. The production system as claimed in claim 3, characterized in that the recognition device (30) has an identification device (33) for capturing at least one of the identity and position of an AGV (18).

12. The production system as claimed in claim 11, characterized in that the identification device (33) has identification means (34, 35) on the production station (2) and on the AGV (18), which identification means are in the form of an ID transmitter and a reading device.

13. The production system as claimed in claim 3, characterized in that the recognition device (30) has an identification device (33) for capturing the identity and position of an AGV (18).

14. The production system as claimed in claim 13, characterized in that the workpieces are vehicle body parts.

15. The production system as claimed in claim 7, characterized in that the safety device is configured to, upon recognition of the AGV by the detection means, reduce flail the protection region of flail the protective device of the AGV.

16. A method for protecting a production station (2) for workpieces (4) and an automated guided vehicle (AGV) (18) which moves into and out of the production station (2) and transports workpieces (4) into and out of the production station (2), wherein the production station (2) and the AGV (18) each have their own controller (13, 21) and their own safety circuit (22, 23), the method comprising:
  said AGV transporting a workpiece into the production station; and
  connecting the safety circuits (22, 23) of the production station (2) and of the AGV (18) situated in the production station (2) to each other;
  during entry to the production station reducing the protection region (29) of a protective device (27) of an intrinsically safe said AGV;
  one or more industrial robots carrying out a process on the workpiece; and
  increasing said protection region during exit of said AGV from the production station.

17. The method as claimed in claim 16, further comprising:
  maintaining the reduced protection region while said intrinsically safe AGV is inside the production.

18. The method as claimed in claim 16, wherein said production station is a multi-cell production station (2) having cell-specific safety circuits (22), and the method further comprises:
  connecting the safety circuit (23) of the AGV (18) to the respective cell-specific safety circuit (22) when the AGV (18) remains in a first production cell (8, 9); and
  in moving the AGV from the first production cell to a second production cell, connecting the safety circuit of the AGV to the respective cell-specific safety circuit of the second production cell so that the safety circuit of the AGV (18) is temporarily simultaneously connected to the cell-specific safety circuits (22) of the first production cell and the second production cell.

19. The method as claimed in claim 16, further comprising:
  when connecting the safety circuits (22, 23), the AGV (18) is incorporated as a triggering safety element and as a disconnectable safety element (25, 26).

* * * * *